Jan. 22, 1929.
D. B. HANNA
1,699,736
POLE REENFORCEMENT
Filed Sept. 8, 1924   3 Sheets-Sheet 1
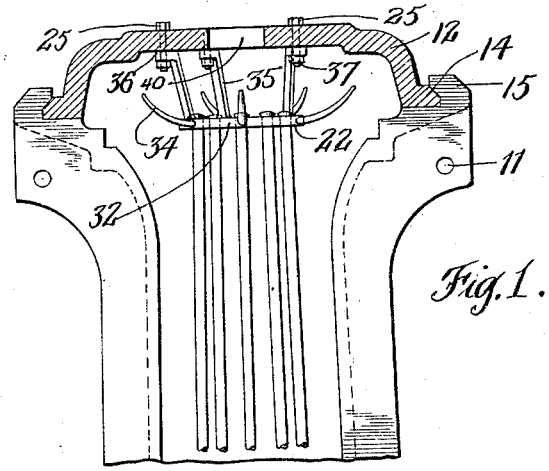
Fig. 1.
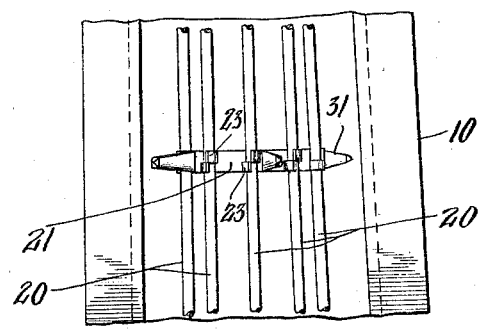
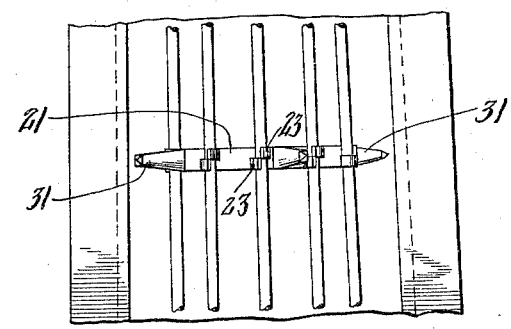
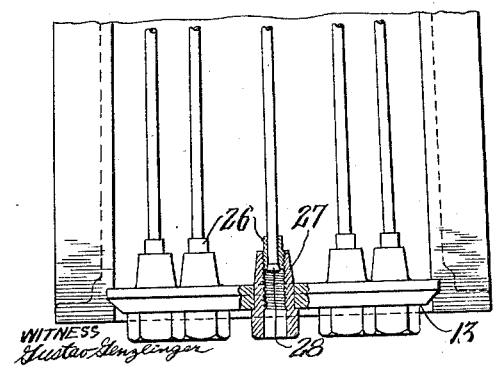
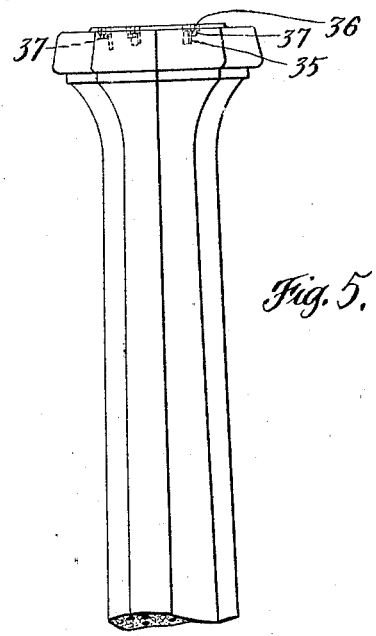
Fig. 5.
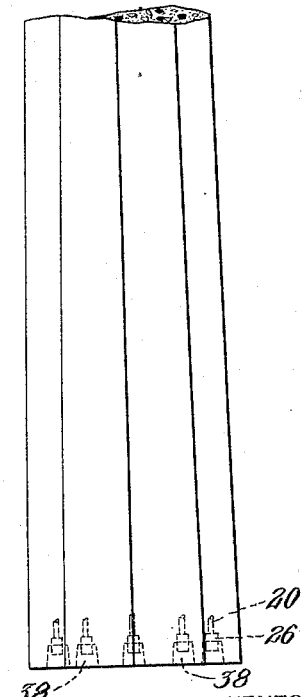
INVENTOR
David B. Hanna
BY
ATTORNEYS Jan. 22, 1929.  D. B. HANNA  1,699,736
POLE REENFORCEMENT
Filed Sept. 8, 1924    3 Sheets-Sheet 3

WITNESS
Gustav Genzlinger

INVENTOR
David B. Hanna
BY
Ernestvedt & Lechner
ATTORNEYS

Patented Jan. 22, 1929.

1,699,736

UNITED STATES PATENT OFFICE.

DAVID B. HANNA, OF CHICAGO, ILLINOIS, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

POLE REENFORCEMENT.

Application filed September 8, 1924. Serial No. 736,409.

My invention relates to pole molds and reenforcement, my aim being to facilitate and cheapen the manufacture of concrete poles, posts, and the like; to provide strong, reliable reenforcement for such poles; and to provide for the attachment of parts or structures to be supported by such poles conveniently and reliably. How these and other advantages can be realized through my invention will appear from my description hereinafter of selected and preferred embodiments.

In the drawings, Fig. 1 shows half of a mold suitable for the purposes of my invention, with a reenforcing system in place in it, various parts being in vertical mid-section, and several intermediate portions broken out and omitted.

Fig. 5 is a side elevation of a pole such as may be produced in the mold shown in Fig. 1, an intermediate portion being broken out and omitted.

Figure 4:
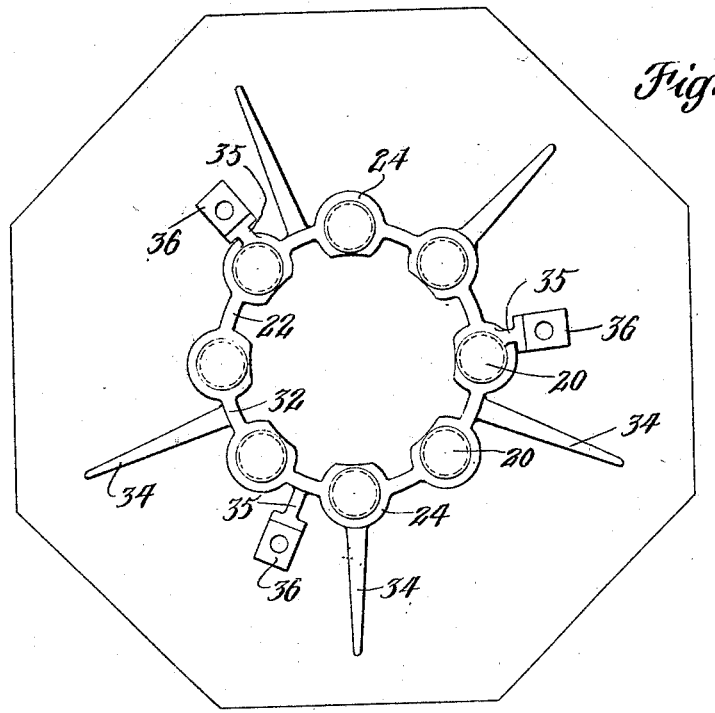
Fig. 4 is a plan view of another member of the reenforcing system shown in Fig. 1, illustrating its relation to a corresponding portion of the mold.

My invention is applicable to poles made in various ways, as by pouring and molding concrete, or by distributing it centrifugally in a revolving mold, and to both solid and hollow poles. I have here illustrated and described it with special reference to the manufacture of solid poles by molding, without resort to centrifugal action.

As illustrated in Fig. 1, the mold 10 may preferably be made in longitudinally divided sections, with flanges at their meeting edges apertured as indicated at 11 for bolts or other fastenings (not shown) to secure the mold sections together. In the present instance, the mold ends or heads 12, 13 are separate, and engage the main portion or sections of the mold 10 at their edges 14. As shown, the corresponding portions of the mold 10 not only afford endwise abutment for the heads 12, 13, but also hook over the edges at 14 to secure them in place. Preferably, the edges 14 and their seats 15 in the mold sections may be correspondingly beveled, as illustrated. The seats 15 may conveniently have the form of grooves extending all the way around the ends of the main mold portion 10.

The reenforcing system shown in Fig. 1 comprises a number of longitudinal members 20 in the from of round metal rods, and also a greater or less number of devices or structures 21, 22, according to the length, etc., of the mold 10 and of the pole to be produced. The rods 20 may preferably extend through or be embraced by the portions 23, 24, of the structures 21, 22 by which they are secured to the latter. In the present instance, these devices 21, 22 serve both to space the rods 20 apart with reference to one another and to position them properly in the mold cavity until the concrete has set. Besides being thus positioned transversely in the mold cavity, the rods 20 are preferably secured and held in position lengthwise. As here shown, the upper ends of the rods 20 are headed or swaged over beyond the device 22 after their insertion through it, and the device 22 is secured against the inner side of the head 12 by bolts 25 extending through holes in the latter. At their lower ends, the rods 20 extend through hexagon-ended screw threaded nipples 26 and are headed over beyond them, and they are secured to the head 13 by hexagon-headed shouldered screws 27 extending through holes in said head 13 and engaging said nipples 26. By tightening up on the screws 27, the rods 20 may be individually drawn and held taut between the ends of the mold.

Figure 2:
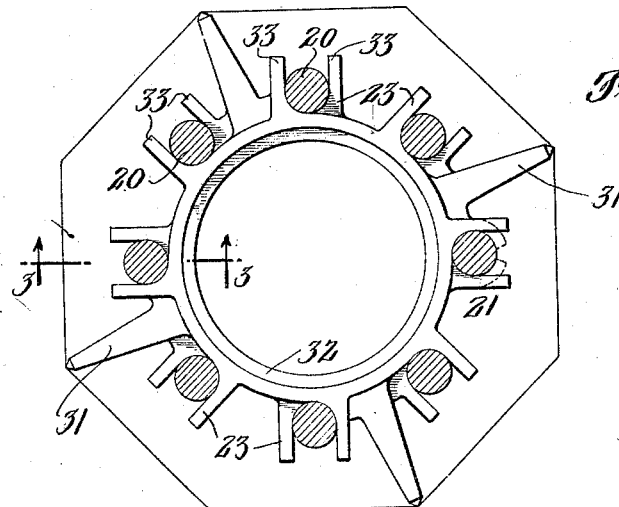
Fig. 2 is a plan view of a member of the reenforcing system shown in Fig. 1, illustrating its relation to the longitudinal reenforcing members and to the mold cavity.
Figure 3:
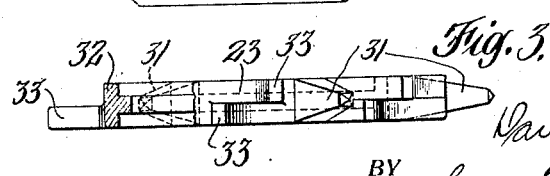
Fig. 3 is an edge view of the device shown in Fig. 2, partly in section as indicated by the line 3—3 in Fig. 2.

As shown in Figs. 1, 2, 3 the intermediate devices 21 are in the nature of spiders, with prongs 31 projecting from annular hollow frame portions 32, and pointed to a 90 degree angle or less at their ends for the purpose of engaging accurately in the corners of the mold cavity. The rod securing portions 23 of these members 21 have the form of semicircular notches with lugs 33 at either side. Initially, the notches 33 are open outward, as shown in Fig. 2, so that the rods 20 may be inserted in them sidewise; but after the rods are in place, the lugs 33 are bent together around the rods 20, as shown in Fig. 1, so as to hold the rods securely, or even grip them tightly.

The upper devices 22 are also in the nature of spiders. As shown in Figs. 1 and 2, their securing means 24 for the rods 20 are preferably formed initially as round eyelets, so as to hold the headed ends of the rods securely. In the present instance, the prongs 34 on the annular frames 32 of the spiders 22 are not long enough to engage the inner surface of the mold 10, but simply serve as reenforcement for the upper end of the pole,—here shown as enlarged or headed,—and are curved upward somewhat (see Fig. 1) for this purpose. This spider 22 also has lateral prongs 35 with feet or lugs 36 apertured to take the bolts 25.

In practice, one or more mold sections 10 comprising about half of the perimeter the mold cavity may be arranged horizontally (or in any other convenient position), with the heads 12, 13 properly engaged with the sections, as shown in Fig. 1. The spider 22 having been bolted to the upper head 12, the corresponding ends of the rods 20 may be slipped through the holes at 24 and headed over,—or if preferred, the rods may be headed in advance and slipped through the holes of the spider 22 before the latter is secured in place. Intermediate spiders 21 are then slipped flat-wise between the rods 20 and turned edge-wise into the position shown in Fig. 1; and the rods are manipulated and slipped into their open notches at 33, being sufficiently flexible for this purpose. Then the nipples 26 are slipped over the lower ends of the rods 20 and the latter headed over at 28 (unless this has been done in advance, prior to the insertion of the rods in the mold), and the screws 27 are inserted through the holes in the head 13 and screwed on the nipples 26 until the rods are drawn properly taut. After this, the remaining section or sections of the mold (not shown) may be put in place and secured, and the concrete poured through opening 40 in cup 12 or in any usual manner. Owing to the engagement of the prongs 31 in the corners of the mold cavity, as indicated in Fig. 2, the rods 20 are not only spaced apart and kept in proper positions relative to one another, but are also accurately positioned in the mold cavity throughout their length.

When the concrete is set sufficiently, the bolts 25 and the screws 27 are withdrawn, thus releasing the pole ends from the mold heads 12, 13. Thereupon the main mold sections 10 are taken apart and the entire pole thus released. As will be seen from Fig. 5, the nuts 37 of the bolts 25 remain in place in the upper end or head of the pole beyond the feet 36 of the lateral prong 35 of the spider 22, so as to afford screw-threaded engagement (in case the prong feet 36 have not been tapped) for similar bolts that may be employed to secure a lighting fixture or other structure to the top of the pole. Likewise, the screw-threaded nipples 26 on the rods 20 remain embedded in the concrete at the lower end of the pole, with their threaded portions exposed in recesses 38 in the concrete, and are available for securing the butt end of the pole, if this should be desired. Both the various spider arms or prongs 31, 34, 35 and the nipples 26, it will be seen, serve to anchor the reinforcement securely in the concrete of the molded pole, and also help to strengthen and reenforce the latter.

Figure 8:
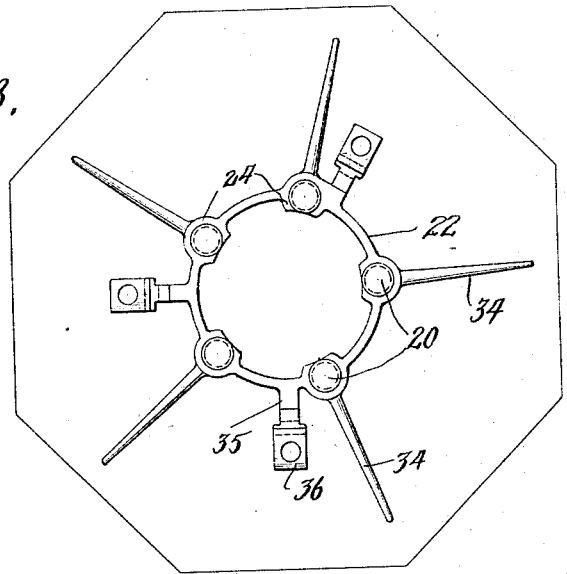
Fig. 8 is a view similar to Fig. 4, illustrating a slightly different form of device.
Figure 9:
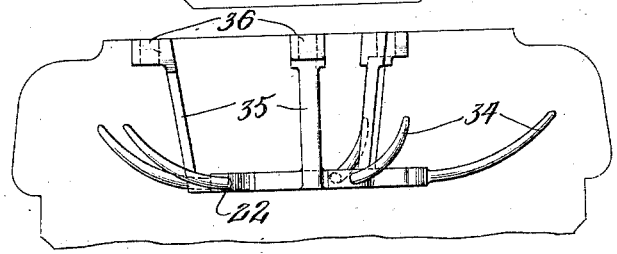
Fig. 9 is a corresponding side view.
Figure 6:
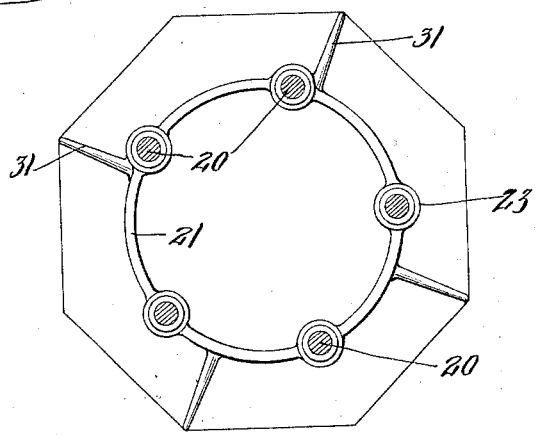
Fig. 6 is a view similar to Fig. 2, illustrating a slightly different form of reenforcing device.
Figure 7:
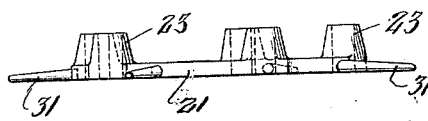
Fig. 7 is a corresponding side view.

In Figs. 6 and 7 is illustrated a somewhat lighter form of intermediate spider 21, in which the rod-engaging portions 23 are not notched, as in Figs. 1, 2, 3, but simply bored to an appropriate size to take the rods 20,—like the corresponding portions of the spider 22 in Fig. 4. As shown in Fig. 7, these rod-engaging portions 23 are of substantial width in the direction of the length of the rods 20, so as to obviate any tendency for the spider 21 to get askew and jam on the rods. In Figs. 8 and 9 is shown a similarly lighter form of spider 22 for the head of the pole. These are suitable for very short poles,—though even for short poles the forms shown in Figs. 1, 2 and 3 are more convenient.

If desired, the apertures of the spiders 21, 22 of both forms (Figs. 2, 3, 4 and 6, 7, 8, 9) may be made of appropriately graded sizes, so that these spiders 21, 22 may be strung or mounted on a suitable tapered mandrel (of wood or of metal—not shown) and thereby automatically spaced, and the rods 20 put in place and secured to the spiders 21, 22 before any of the parts are inserted in the mold 10. In this case, the mold end 13 will be left off until the mandrel has been withdrawn; then it will be put in place and the screws 26 inserted and used to tighten up the rods 20 as before.

I claim:

1. A reenforcing system for a pole, comprising longitudinal rods and a spider secured to their ends having prongs for reenforcing the corresponding pole end and securing a structure to be supported by the pole.

2. A reenforcing system for a pole, comprising longitudinal rods and a spacing structure secured to their ends and affording screw threaded means of attachment for securing a structure to be supported by the pole.

3. A reenforcing structure for concrete poles comprising an upper spider having means for engaging a plurality of reenforcing rods, a plurality of lateral supporting prongs engaging said spider, said lateral supporting prongs having openings at their upper ends to provide means for engaging lighting units and the like when the pole is completed.

4. A reenforcing structure for concrete poles comprising an upper spider having means for engaging a plurality of reenforcing rods, a plurality of lateral supporting prongs engaging said spider, said spider having a plurality of supporting prongs, said lateral supporting prongs having openings at their upper ends to provide means for engaging lighting units and the like when the pole is completed.

5. A reenforcing structure for concrete poles comprising an upper spider having means for engaging a plurality of reenforcing rods, a plurality of lateral supporting prongs engaging said spider, said lateral supporting prongs having openings at their upper ends to provide means for engaging lighting units and the like when the pole is completed and a plurality of reenforcing spiders distributed along said reenforcing rods.

6. A reenforcing structure for concrete poles comprising an upper spider having means for engaging a plurality of reenforcing rods, a plurality of lateral supporting prongs engaging said spider, said lateral supporting prongs having openings at their upper ends to provide means for engaging lighting units and the like when the pole is completed, a plurality of reenforcing spiders distributed along said reenforcing rods and means at the lower end of said rods for engaging a foundation anchorage when the finished pole is set up.

In testimony whereof, I have hereunto signed my name.

DAVID B. HANNA.